Oct. 5, 1948.　　　R. D. JONES　　　2,450,664
DYNAMOELECTRIC MACHINE
Filed Oct. 18, 1946
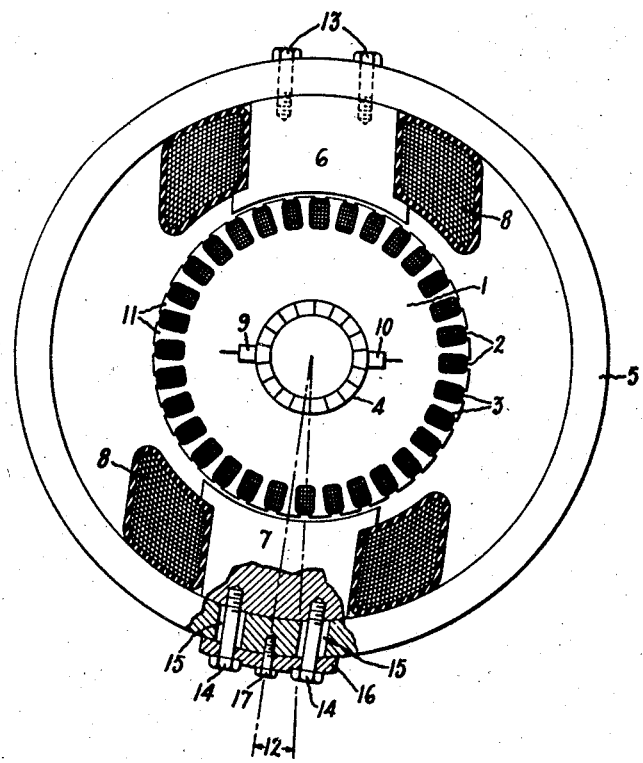
Inventor:
Ray D. Jones,
by Browell P. Mack
His Attorney.

Patented Oct. 5, 1948

2,450,664

UNITED STATES PATENT OFFICE 2,450,664

DYNAMOELECTRIC MACHINE

Ray D. Jones, Fort Wayne, Ind., assignor to General Electric Company, a corporation of New York Application October 18, 1946, Serial No. 704,233

7 Claims. (Cl. 171—252)

My invention relates to commutating type dynamoelectric machines and particularly to direct current generators of this type.

An object of my invention is to provide improved commutator type dynamoelectric machines.

Another object of my invention is to provide an improved commutating dynamoelectric machine with an arrangement for minimizing commutator ripple or alternating current voltages superimposed on the direct current voltage of the machine.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing schematically illustrates a commutating type dynamoelectric machine provided with an embodiment of my invention.

In the illustrated arrangement of my improved dynamoelectric machine, I have shown an embodiment of my invention applied to a commutating type direct current generator provided with a rotatable armature member having a core 1 of magnetic material with winding slots 2 therein circumferentially spaced substantially equal slot pitches apart around the periphery thereof with an armature winding 3 arranged in the slots 2 and connected in any suitable manner to a conventional commutator 4. Magnetic excitation is provided to this machine by a stationary field member having a suitable magnet frame 5 and a plurality of pairs of pole pieces of magnetic material. In the illustrated construction, only one pair of pole pieces is shown in order to simplify the explanation of this embodiment of my invention. This pair of pole pieces includes pole pieces 6 and 7 of opposite polarity adapted to be excited in any suitable manner, as by a field exciting winding 8 energized by a source of electrical power for inducing a voltage in the armature winding 3. The components of voltage induced in the armature winding 3 are adapted to be connected to a load through a pair of brushes 9 and 10 arranged in contact with the commutator 4 so as to provide substantially two equal interconnected parallel circuits through the armature winding 3.

It has been found that an alternating current voltage, or commutator ripple as it is termed, is produced in large part by the passing of the teeth 11 of the armature core under the pole pieces which results in a variation of the permeance of the magnetic circuit. This in turn produces flux pulsations which generate an alternating current component of voltage which appears between the brushes 9 and 10 superimposed on the normal direct current voltage between these brushes. When the number and spacing of the armature teeth are such that at any instant the physical relationship of the teeth under one pole to that pole is the same as the physical relationship of teeth under a pole of opposite magnetic polarity to that pole is alike, the alternating current voltages are in phase and additive. This makes the alternating current voltage which appears superimposed on the direct current voltage at the brushes substantially the sum of the alternating current voltage generated under each pole. In order to minimize or substantially eliminate this alternating current voltage superimposed on the normal direct current voltage of the machine, I provide an arrangement for inducing substantially equal and opposite alternating current components of voltage in the two interconnected parallel circuits of the armature winding, thereby producing a net or resultant alternating current voltage between the terminals of the commutator brushes 9 and 10 which is the difference between the alternating current components of voltage in the two interconnected circuits, thus minimizing the superimposed A.-C. voltage. The normal construction of equal spacing of poles provides this cancellation of the superimposed alternating current voltage when there is an odd number of armature slots per pair of poles; however, when there is an even number of slots per pair of poles, the alternating current voltages add as described above. This arrangement may be utilized in any machine of this type, providing the equal and opposite alternating current voltages are induced between parallel paths which are interconnected by commutator brushes. In the illustrated construction which has an even number of slots per pole, this cancellation of the alternating current voltages between the terminals of the machine is obtained by arrangement of adjacent pole pieces 6 and 7 of opposite polarity spaced substantially one-half slot pitch different from 180 electrical degrees apart, as indicated by the angle 12 between the centerlines of the pole pieces 6 and 7. This unequal spacing between adjacent pole pieces of opposite polarity provides for locating the application points of the magnetic fields inducing the alternating current voltages whereby alternating current voltages induced under the various points of application of the magnetic field in the two parallel paths of the armature winding 3 are substantially equal and in phase opposition in the interconnected armature circuits between brushes of opposite polarity, and, therefore, substantially cancel each other at the terminals of the machine. In toothed core machines, a complete cycle is produced for each cycle of permeance change, that is for each passage of an armature tooth under a pole. Thus, one-half slot pitch displacement of the pole per pair of poles with reference to the armature teeth changes the phase of the induced alternating current voltage by 180 electrical degrees in a two-pole machine.

The amount of the induced alternating current voltage under any pole may vary depending on such manufacturing variations as difference in air gap caused by lack of perfect concentricity, variation of pole tip chamfer, lack of perfect pole spacing, or other similar variations so that the minimum resultant superimposed alternating current appearing between the brushes may not be at exactly 180 electrical degree displacement of the voltages generated under each pole. In order to provide for more accurate adjustment of the relative position of the pole pieces 6 and 7 of opposite polarity, one or both of the pole pieces may be mounted on the stationary magnet frame 5 of the machine, as shown with respect to the salient pole piece 7, or one of the salient pole pieces, such as the pole piece 6, may be permanently secured in any suitable manner, as by bolts 13. The salient pole piece 7 is shown angularly adjustably secured in position by bolts or other suitable securing devices 14 which extend through circumferentially elongated slots 15 through the magnet frame 5 which are longer than the diameter of the securing bolts 14, and a positioning plate 16 is arranged under the heads of the bolts 14 such that the pole piece 7 can be moved a slight angle circumferentially of the magnet frame 5 to provide the best position therefor for substantial cancellation or elimination of the commutator ripple of the machine. After the pole piece 7 has been located in its most desirable position for minimizing the commutator ripple, the positioning plate 16 is rigidly secured to the magnet frame 5 as by being bolted thereto by a bolt 17 or by spot welding the plate 16 to the magnet frame 5, after which the pole piece securing bolts 14 may be drawn up more tightly if desired. This arrangement for adjusting the position of one or more of the salient pole pieces of the machine need not be used but may be found desirable in certain instances to provide more accurate adjustment of the position of the pole pieces, and the illustrated arrangement is shown for illustrative purposes only of this feature of the invention.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A commutating dynamoelectric machine including a rotatable armature member provided with a commutator and having a core of magnetic material and winding slots therein with a winding in said slots, and a stationary field member having salient pole pieces of magnetic material arranged with the center lines of adjacent pole pieces of opposite polarity spaced substantially one-half armature slot pitch different from 180 electrical degrees apart, said pole pieces being arranged to provide normal excitation to said machine and to induce substantially equal and opposite alternating current components of voltage in said armature whereby commutator ripple caused by said slots passing said pole pieces is reduced.

2. A commutating dynamoelectric machine including a rotatable armature member provided with a commutator and having a core of magnetic material and winding slots therein with a winding in said slots, a stationary field member having a magnet frame, salient pole pieces of magnetic material, and means for securing said pole pieces to said magnet frame with the center lines of adjacent pole pieces of opposite polarity spaced substantially one-half armature slot pitch different from 180 electrical degrees apart, said pole pieces being arranged to provide normal excitation to said machine and to induce substantially equal and opposite alternating current components of voltage in said armature whereby commutator ripple caused by said slots passing said pole pieces is reduced.

3. A commutating dynamoelectric machine including a rotatable armature member provided with a commutator and having a core of magnetic material and winding slots therein with a winding in said slots, a stationary field member having a magnet frame, salient pole pieces of magnetic material, and means for adjustably securing said pole pieces to said magnet frame with the center lines of adjacent pole pieces of opposite polarity spaced substantially one-half armature slot pitch different from 180 electrical degrees apart, said pole pieces being arranged to provide normal excitation to said machine and to induce substantially equal and opposite alternating current components of voltage in said armature whereby commutator ripple caused by said slots passing said pole pieces is reduced.

4. A commutating dynamoelectric machine including a rotatable armature member provided with a commutator and having a core of magnetic material and winding slots therein with a winding in said slots, and means including a stationary field member having salient pole pieces of magnetic material arranged to provide normal excitation to said machine and for inducing substantially equal and opposite alternating current components of voltage between interconnected parallel circuits through said armature winding.

5. A commutating dynamoelectric machine including a rotatable armature member having a core of magnetic material and winding slots therein with a winding in said slots, a commutator connected to said armature winding, means including brushes for said commutator providing interconnected parallel circuits through said armature winding, and means including a stationary field member having salient pole pieces of magnetic material arranged to provide normal excitation to said machine and for inducing substantially equal and opposite alternating current components of voltage between interconnected parallel circuits through said armature winding.

6. A commutating dynamoelectric machine including a rotatable armature member having a core of magnetic material and winding slots therein with a winding in said slots, a commutator connected to said armature winding, means including brushes for said commutator providing interconnected parallel circuits through said armature winding, and means including a stationary field member having salient pole pieces of magnetic material arranged with adjacent pole pieces of opposite polarity adjustably spaced to provide normal excitation to said machine and for inducing substantially equal and opposite alternating current components of voltage between interconnected parallel circuits through said armature winding.

7. A commutating dynamoelectric machine including a rotatable armature member provided with a commutator and having a core of magnetic material and winding slots therein with a winding in said slots, means including a stationary field member for impressing magnetic fields on said armature member, and means for angularly locating the application points of said magnetic fields whereby alternating current voltages induced under the various points of application of the magnetic fields have substantially equal and opposite phase relationship in interconnected circuits between brushes of opposite polarity.

RAY D. JONES.

REFERENCES CITED

The following references are of record in the file of this patent:

UNITED STATES PATENTS

| Number | Name | Date |
|---|---|---|
| 1,160,087 | Neuland | Nov. 10, 1915 |
| 1,622,204 | Papst | Mar. 22, 1927 |